United States Patent
Gonze et al.

(10) Patent No.: US 10,859,153 B2
(45) Date of Patent: Dec. 8, 2020

(54) THERMAL TRANSMISSION MANAGEMENT STRATEGY

(71) Applicant: GM Global Technology Operations LLC, Detroit, MI (US)

(72) Inventors: Eugene V. Gonze, Pinckney, MI (US); John W. Myers, Brighton, MI (US); Daniel J. Shepard, Milford, MI (US); Michael J. Paratore, Jr., Howell, MI (US); Richard J. Lopez, Bloomfield, MI (US)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 9 days.

(21) Appl. No.: 16/279,225

(22) Filed: Feb. 19, 2019

(65) Prior Publication Data
US 2020/0263783 A1      Aug. 20, 2020

(51) Int. Cl.
| | |
|---|---|
| *F16H 57/04* | (2010.01) |
| *F01P 3/20* | (2006.01) |
| *F01P 5/02* | (2006.01) |
| *F01P 7/14* | (2006.01) |
| *F01P 7/16* | (2006.01) |
| *F01P 11/08* | (2006.01) |

(52) U.S. Cl.
CPC .......... *F16H 57/0475* (2013.01); *F01P 3/20* (2013.01); *F01P 5/02* (2013.01); *F01P 7/14* (2013.01); *F01P 7/16* (2013.01); *F16H 57/0413* (2013.01); *F16H 57/0417* (2013.01); *F01P 11/08* (2013.01); *F01P 2007/146* (2013.01); *F01P 2050/22* (2013.01)

(58) Field of Classification Search
CPC .... F16H 57/0475; F16H 57/0417; F01P 3/20; F01P 5/02; F01P 7/14
See application file for complete search history.

(56) References Cited

U.S. PATENT DOCUMENTS

| | | | | |
|---|---|---|---|---|
| 9,964,019 | B2* | 5/2018 | Gopal | F01P 7/165 |
| 2008/0121381 | A1* | 5/2008 | So | F28D 1/0461 165/140 |
| 2012/0055565 | A1* | 3/2012 | Kanzaka | F01M 5/007 137/468 |
| 2013/0152882 | A1* | 6/2013 | Potter | F16H 57/0413 123/41.33 |
| 2018/0298913 | A1* | 10/2018 | Savage | F04D 29/34 |

* cited by examiner

*Primary Examiner* — Syed O Hasan (57) ABSTRACT

A vehicle thermal management system includes a radiator receiving a liquid coolant in a coolant supply line and discharging the coolant into a coolant pump supply line. A coolant pump receives the coolant from the coolant pump supply line and discharges the coolant into multiple engine components. A transmission oil heat exchanger defining a first transmission oil heat exchanger receives the coolant after being discharged from the multiple engine components. An air-to-coolant sub-cooling heat exchanger defines a second transmission oil heat exchanger. The sub-cooling heat exchanger receives a portion of the coolant bypassing the multiple engine components.

16 Claims, 6 Drawing Sheets

THERMAL TRANSMISSION MANAGEMENT STRATEGY

INTRODUCTION

The present disclosure relates to automobile vehicle transmission cooling systems and methods.

The oil systems of automobile vehicle automatic transmissions are commonly cooled in one of three ways. A first cooling method employs convective cooling using fins or cooling surfaces exposed to ambient air flow, which removes heat from the transmission convectively. A second cooling method uses an air-to-oil cooler through which transmission oil is circulated using the transmission oil pump and an oil flow path that commonly transfers oil forward to the engine radiator area, thereby requiring cooling outflow and return flow tubing and frequently a control valve to open or close the cooling path. A third cooling method uses engine coolant which is circulated to an independent heat exchanger through which transmission oil is also circulated. The third method is limited by the amount of coolant and the temperature of the coolant which is available at any particular operating condition. Items that can effect each cooling method are limitations of the coolant medium temperature that is available, the cost of an independent heat exchanger and system flow piping, and an inability to reach a desired cooled oil temperature of 80 degrees Centigrade when the engine coolant temperature is approximately 80 degrees Centigrade.

Thus, while current automobile vehicle transmission cooling systems achieve their intended purpose, there is a need for a new and improved system and method for cooling transmissions.

SUMMARY

According to several aspects, a vehicle thermal management system includes a radiator receiving a liquid coolant in a coolant return line and discharging the coolant into a coolant pump supply line. A coolant pump receives the coolant from the coolant pump supply line and discharges the coolant into multiple engine components. A transmission oil heat exchanger defining a first transmission oil heat exchanger receives the coolant after being discharged from the multiple engine components. An air-to-coolant sub-cooling heat exchanger defining a second transmission oil heat exchanger receives a portion of the coolant bypassing the multiple engine components.

In another aspect of the present disclosure, a coolant control valve controls sub-cooling coolant flow to the sub-cooling heat exchanger.

In another aspect of the present disclosure, the coolant control valve includes: an engine rotary valve; an oil rotary valve distributing the coolant received in the coolant control valve and from the sub-cooling heat exchanger; and a radiator rotary valve distributing the coolant received in the coolant control valve back to the radiator or to an oil rotary valve.

In another aspect of the present disclosure, a first bypass line provides a path to bypass coolant discharged by the coolant pump after receipt from the radiator around the engine components and into the sub-cooling heat exchanger.

In another aspect of the present disclosure, the first bypass line is connected to the coolant control valve.

In another aspect of the present disclosure, if a temperature of a transmission oil is determined to be above an optimal temperature range, a transmission cooling operation is initiated and a transmission cooling command is generated.

In another aspect of the present disclosure, upon receipt of the transmission cooling command a maximum cooling request is determined, the maximum cooling request identifying if the transmission oil temperature is either below or above a predetermined cooling threshold.

In another aspect of the present disclosure, if the transmission oil temperature is below the cooling threshold a cooling command is generated and a set-up cooling mode is initiated which performs two functions: a first function sets the engine rotary valve to a full open position and a second function sets the radiator rotary valve to a cooling mode.

In another aspect of the present disclosure, if the transmission oil temperature is above the cooling threshold, a maximum cooling command is generated and a thermal energy-to-transfer calculation is performed.

In another aspect of the present disclosure, the thermal energy-to-transfer calculation includes: a first step determining a coolant flow rate for the sub-cooling heat exchanger; a second step determining a setting of the radiator rotary valve as a function of a transmission coolant flow rate and an engine coolant flow rate; a third step wherein the oil rotary valve is set to a transmission cooling operation; and a fourth step wherein operation of a radiator fan is selected ON if a transmission heat load is less than a heat load of the sub-cooling heat exchanger, else the radiator fan is OFF.

In another aspect of the present disclosure, the sub-cooling heat exchanger further cools the coolant discharged from the radiator to provide the coolant at lower temperatures than engine setpoints for cooling a transmission oil.

According to several aspects, a vehicle thermal management system includes a radiator receiving a liquid coolant from a coolant return line and discharging the coolant into a coolant pump supply line. A coolant pump receives the coolant from the coolant pump supply line and discharges a first portion of the coolant into multiple engine components. A coolant control valve receives the first portion of the coolant discharged from the multiple engine components. A transmission oil heat exchanger defining a first transmission oil heat exchanger is in communication with the coolant control valve and receives the first portion of the coolant after being discharged from the multiple engine components. An air-to-coolant sub-cooling heat exchanger defines a second transmission oil heat exchanger. The sub-cooling heat exchanger receives a second portion of the coolant bypassing the multiple engine components. The sub-cooling heat exchanger further cools the second portion of the coolant to provide the second portion of the coolant at a lower temperature than engine setpoints for cooling a transmission oil. The sub-cooling heat exchanger discharges the second portion of the coolant into the coolant control valve for selective distribution into the transmission oil heat exchanger.

In another aspect of the present disclosure, a coolant control valve controls sub-cooling coolant flow to the sub-cooling heat exchanger.

In another aspect of the present disclosure, the coolant control valve includes: an engine rotary valve receiving coolant discharged from the multiple engine components; a radiator rotary valve distributing the coolant received from the engine rotary valve back to the radiator; and an oil rotary valve distributing the coolant received from the engine rotary valve and from the sub-cooling heat exchanger.

In another aspect of the present disclosure, the radiator rotary valve is further connected to: at least one heater core; and an engine oil heat exchanger.

In another aspect of the present disclosure, a radiator fan is included, wherein conditions for operation of the radiator fan are based on optimized heat transmission, including application of physics-based requirements for the sub-cooling heat exchanger including: 1) Transmission Cooling Physics; 2) Operation Degraded Physics; and 3) Reliability Degraded Physics.

In another aspect of the present disclosure, the Transmission Cooling Physics include: a transmission oil target temperature set at a first predetermined temperature for rear-wheel drive vehicles and a second predetermined temperature different from the first predetermined temperature for front-wheel drive vehicles; and a transmission cooling mode being active when the transmission oil target temperature is exceeded and a transmission warming operation is complete.

In another aspect of the present disclosure, the Operation Degraded Physics include: a transmission oil target temperature reaching a first predetermined temperature for rear-wheel drive vehicles and a second predetermined temperature different from the first predetermined temperature for front-wheel drive vehicles; a sub-cooled fan logic objective providing a sub-cooled coolant target temperature correlated to a transmission oil temperature above the transmission oil target temperature, the sub-cooled target temperature calculated as follows: sub-cooled coolant target temp=transmission oil target temperature−[transmission oil temperature−transmission oil target temperature]; and IF: a sub-cooled coolant temperature>sub-cooled coolant target temperature THEN FAN Request is ACTIVE, ELSE FAN Request is OFF; ELSE: If engine-in coolant temperature>[engine in target coolant temperature+Hysteresis] THEN FAN Request is ACTIVE, ELSE FAN Request is OFF.

In another aspect of the present disclosure, the Reliability Degraded Physics include: a transmission oil temperature reaching or exceeding a third predetermined temperature; a sub-cooled target temp=transmission oil target temperature−[transmission oil temperature−transmission oil target temperature]; and IF: sub-cooled coolant temperature>sub-cooled coolant target temperature THEN FAN Request is ACTIVE, ELSE FAN Request is OFF; ELSE: If engine-in coolant temperature>[engine in target temperature+Hysteresis] THEN FAN Request is ACTIVE, ELSE FAN Request is OFF; a pump logic wherein a transmission coolant flow=transmission oil flow×(specific heat of the transmission oil divided by a specific heat of the coolant)×sub-cooled heat exchanger efficiency calibration.

According to several aspects, a vehicle thermal management system includes a radiator receiving a liquid coolant from a coolant return line and discharging the coolant into a coolant pump supply line. A coolant pump receives the coolant from the coolant pump supply line and discharges a first portion of the coolant into multiple engine components. A coolant control valve receives the first portion of the coolant discharged from the multiple engine components. A transmission oil heat exchanger defining a first transmission oil heat exchanger is in communication with the coolant control valve and receives the first portion of the coolant after being discharged from the multiple engine components. An air-to-coolant sub-cooling heat exchanger defining a second transmission oil heat exchanger receives a second portion of the coolant bypassing the multiple engine components. The sub-cooling heat exchanger further cools the second portion of the coolant to provide the second portion of the coolant at a lower temperature than engine setpoints for cooling a transmission oil. A radiator fan is included, wherein conditions for operation of the radiator fan are based on optimized heat transmission including application of physics-based requirements for the sub-cooling heat exchanger.

In another aspect of the present disclosure, a valve of the coolant control valve is operated to: divert the second portion of the coolant through the sub-cooling heat exchanger during a cooling mode of operation when a transmission oil target temperature exceeds a predetermined temperature, the coolant control valve operating to stop all flow of the coolant to the transmission oil heat exchanger during an optimal temperature operation; divert hot coolant for warming the transmission oil; and regulate coolant flow to maintain and optimize transmission oil temperature; and the sub-cooling heat exchanger discharges the second portion of the coolant into the coolant control valve for selective distribution into the transmission oil heat exchanger.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
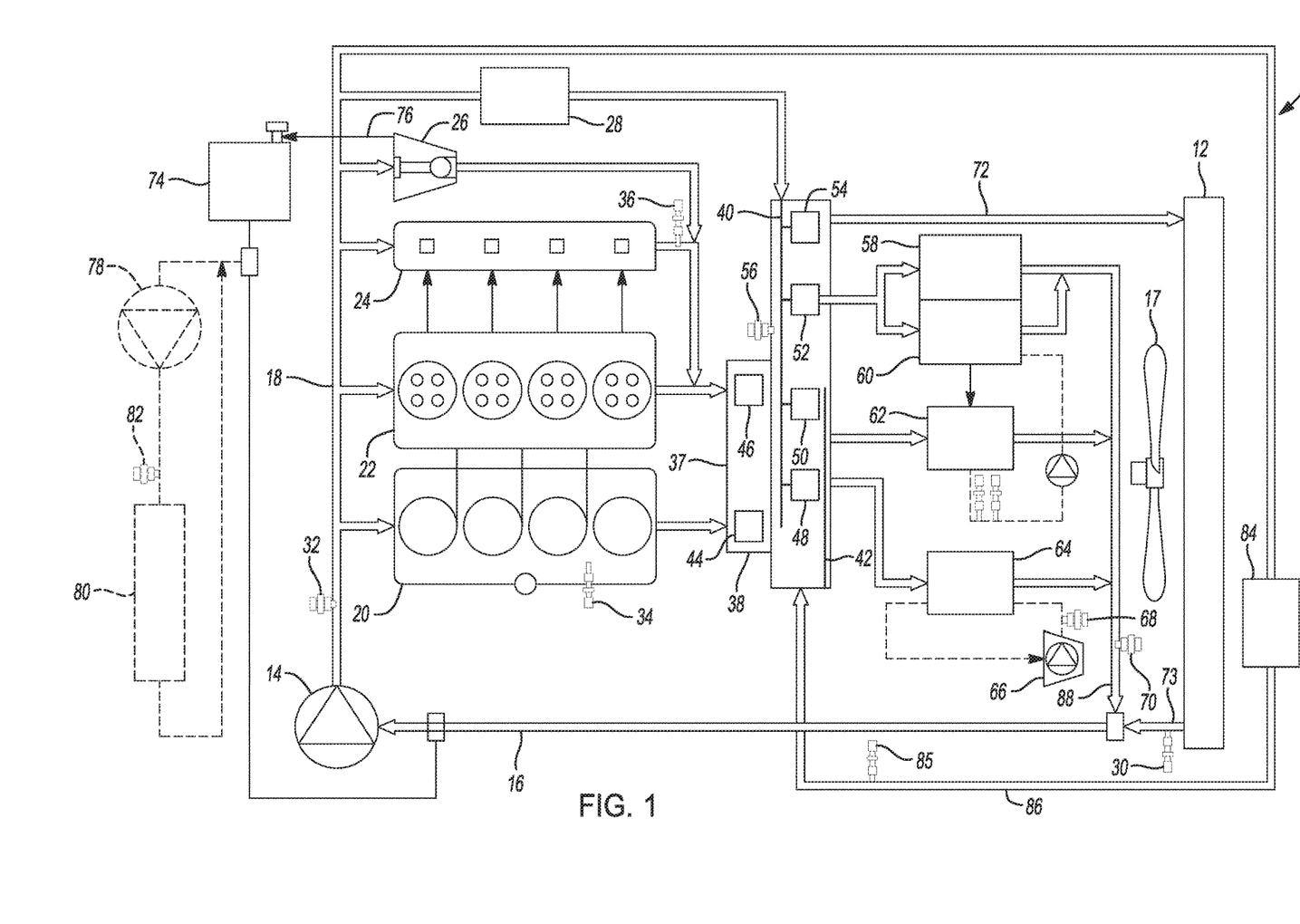
FIG. 1 is a diagram of a vehicle thermal management system according to an exemplary aspect.

Referring to FIG. 1, a vehicle thermal management system 10 includes a radiator 12 which convectively cools a liquid coolant transferred by operation of a coolant pump 14 which receives cooled liquid coolant from the radiator 12 via a coolant pump supply line 16. The coolant pump 14 may be an electric or a mechanical pump. A radiator fan 17 is provided with the radiator 12 to provide positive air flow through the radiator 12 if the vehicle is not moving at sufficient speed to generate air flow through the radiator for removing engine and transmission heat loads, normally when a vehicle air-conditioning system is operational, and if additional air flow is desired through the radiator 12 to achieve maximum cooling conditions. The coolant pump 14 discharges coolant into a coolant distribution header 18 where a first portion of the coolant is distributed to multiple engine components which can include an engine block 20, an engine head 22, an integrated exhaust manifold (IEM) 24, a turbocharger 26 and an exhaust gas heat exchanger 28 which according to several aspects can be an exhaust gas recirculation (EGR) device or an exhaust gas heat recovery (EGHR) device. Various system temperatures are sensed, for example using a radiator coolant temperature sensor 30, an engine inlet coolant temperature sensor 32, a block coolant temperature sensor 34, and a cylinder head-IEM coolant temperature sensor 36.

After passing through any of the engine block 20, the engine head 22, the IEM 24, and/or the turbocharger 26 the first portion of the coolant is distributed to a coolant control valve 37 having multiple valve parts or segments including a block or engine rotary valve 38 which selectively distributes coolant from engine components to a radiator rotary valve 40. The radiator rotary valve 40 is provided to distribute coolant from the engine rotary valve 38 for heating purposes or to return coolant to the radiator 12, and an oil rotary valve 42 is also provided to distribute coolant from the radiator rotary valve 40 for engine or transmission oil heating or from the coolant distribution header 18 through a first bypass line 86 discussed below for cooling purposes.

The engine rotary valve 38 includes at least a first valve port 44 and a second valve port 46. The oil rotary valve 42 includes at least a third valve port 48 and a fourth valve port 50. The radiator rotary valve 40 includes at least a fifth valve port 52 and a sixth valve port 54. An engine outlet coolant temperature sensor 56 is provided with the radiator rotary valve 40. If the fifth valve port 52 is selectively opened, coolant is distributed to a first heater core 58 and a second heater core 60 for passenger compartment heating. Coolant can also be routed using the engine rotary valve 38 from the head 22 and the IEM 24 using the second valve port 46 and/or coolant can be routed from the block 20 using the first valve port 44. Coolant can also be routed using the oil rotary valve 42 to one or both of an engine oil heat exchanger 62 and a transmission oil heat exchanger 64 defining a first transmission oil heat exchanger. A transmission oil pump 66 may be operated to circulate transmission oil through the transmission oil heat exchanger 64 in response to a temperature signal generated by a transmission oil temperature sensor 68.

Figure 2:
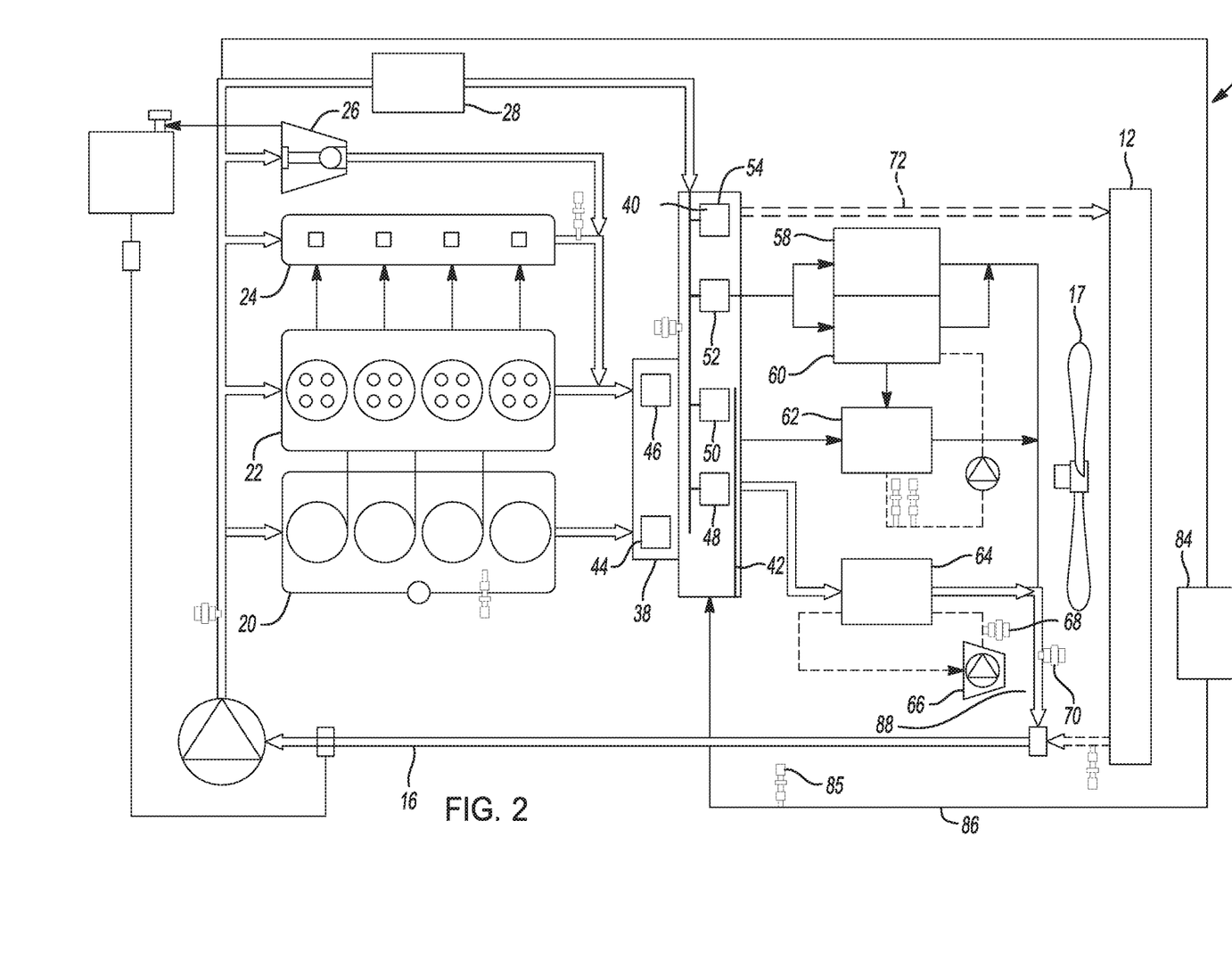
FIG. 2 is a diagram modified from FIG. 1 to highlight a warmup operation.

A coolant bypass outlet temperature sensor 70 located in a second bypass line 88 described in reference to FIG. 2 provides a temperature of the coolant which is discharged from any or all of the first heater core 58, the second heater core 60, the engine oil heat exchanger 62 or the transmission oil heat exchanger 64 and is measured prior to returning into the coolant pump supply line 16. A coolant supply line 72 supplies coolant from the radiator rotary valve 40 to the radiator 12. Coolant is discharged from the radiator 12 in a coolant return line 73 prior to entering the coolant pump supply line 16.

A surge tank 74 may be connected to the turbocharger 26 using a surge tank inlet line 76. A charge-air cooling pump 78 can be selectively operated to provide flow into a charge-air cooler (CAC) 80 which is used to cool engine intake air after it passes through a compressor of the turbocharger 26 prior to entrance into the engine intake manifold for increased power and improved fuel economy. A charge air inlet coolant temperature sensor 82 signals a sensed temperature of the coolant being supplied to the CAC 80.

An air-to-coolant heat exchanger defining a sub-cooling heat exchanger 84 provides a second transmission oil heat exchanger with the vehicle thermal management system 10. The sub-cooling heat exchanger 84 provides a path to bypass a second portion of the coolant discharged by the coolant pump 14 after receipt from the radiator 12 and the second bypass line 88 around the engine components via a first bypass line 86. A sub-cooled coolant bypass outlet temperature sensor 85 generates a signal representative of the temperature of the coolant discharged from the transmission sub-cooling heat exchanger 84 and is located in the first bypass line 86. The first bypass line 86 is connected into the coolant control valve 37 and in communication with the oil rotary valve 42. Heat from the engine components is therefore not added to the bypassed second portion of the coolant discharged from the sub-cooling heat exchanger 84. The bypassed second portion of the coolant is directed into the oil rotary valve 42 of the coolant control valve 37. The sub-cooling heat exchanger 84 further cools the second portion of the coolant discharged from the coolant pump 14 and therefore outputs the second portion of the coolant at a lower temperature than the engine setpoints or the engine operating temperatures. The second portion of the coolant output from the sub-cooling heat exchanger 84 is directed into the transmission oil heat exchanger 64 when additional cooling of the transmission oil by the transmission oil heat exchanger 64 is requested. This permits transmission oil temperature to be reduced below an engine operating temperature, which allows optimal drive quality without compromising CO2 performance through physics-based controls which are discussed in greater detail in reference to FIGS. 6, 7 and 8 below.

Referring to FIG. 2 and again to FIG. 1, a portion of the vehicle thermal management system 10 is highlighted which is used during a transmission warming operation. Transmission warming is intended to maximize $CO_2$ performance. During the transmission warming operation, all coolant from the engine rotary valve 38 enters into the radiator rotary valve 40. The second valve port 46 of the engine rotary valve 38 is opened to direct coolant flow from the engine head 22, the IEM 24, the turbocharger 26 and feeds into the radiator rotary valve 40 and mixes with the coolant from the exhaust gas heat exchanger 28, which represents the heated coolant. In some operating conditions the first valve port 44 may be open allowing coolant to pass through the block 20 if an optimum block operating temperature is reached as indicated by the block coolant temperature sensor 34. The sixth valve port 54 of the radiator rotary valve 40 may be operated to direct a first portion of the heated coolant to be returned via the coolant supply line 72 to the radiator 12. The oil rotary valve 42 is also opened to direct a second portion of heated coolant through the third valve port 48 to the transmission oil heat exchanger 64.

As previously discussed, the transmission oil pump 66 is operated at this time to circulate transmission oil through the transmission oil heat exchanger 64 and in reliance on the temperature signal from the transmission oil temperature sensor 68. To heat the transmission oil, thermal energy is conductively transferred from the coolant which has been heated by the engine components to the oil in the transmission oil heat exchanger 64. Coolant discharged from the transmission oil heat exchanger 64 is returned to the coolant pump supply line 16 via a second bypass line 88. The coolant bypass outlet temperature sensor 70 generates a signal representative of the temperature of the coolant discharged from the transmission oil heat exchanger 64 which is being returned via the second bypass line 88. The fourth valve port 50 of the oil rotary valve 42 and the fifth valve port 52 of the radiator rotary valve 40 are closed at this time which isolates coolant flow into any of the first heater core 58, the second heater core 60 or the engine oil heat exchanger 62. There is also substantially no coolant flow through the sub-cooling heat exchanger 84 during the transmission warming operation.

Referring to FIG. 3 and again to FIG. 2, positions of the engine rotary valve 38, the radiator rotary valve 40 and the oil rotary valve 42 during the transmission warming operation are presented. A throttling feature 90 can be provided with any of the valve ports to throttle coolant flow such as for throttling coolant flow through the sixth valve port 54 of the radiator rotary valve 40 into the coolant supply line 72 for supply to the radiator 12.

Figure 3:
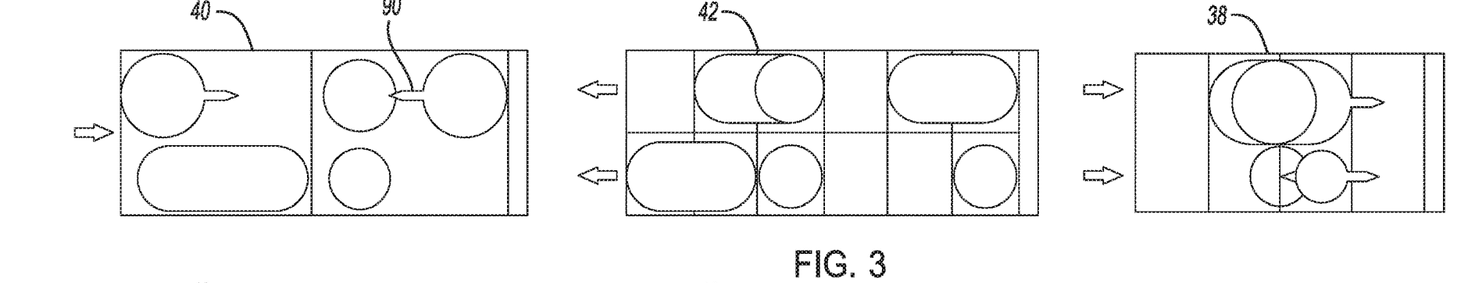
FIG. 3 is a rotary valve position chart including an engine valve, a radiator valve and an oil valve shown in warmup operation positions.

Referring to FIG. 4 and again to FIGS. 1, 2 and 3, a portion of the vehicle thermal management system 10 is highlighted which is used during a transmission temperature maintaining operation. Transmission temperature maintaining is conducted with substantially no coolant flow directed to any of the first heater core 58, the second heater core 60, the engine oil heat exchanger 62 or the transmission oil heat exchanger 64. During the transmission maintaining operation the second valve port 46 of the engine rotary valve 38 is opened to direct coolant flow through the engine head 22, the IEM 24, the turbocharger 26, the first valve port 44 and the engine block 20 may be open. Both valve ports feed coolant into the radiator rotary valve 40 to mix with the coolant from the exhaust gas heat exchanger 28 inside the radiator valve 40.

Figure 4:
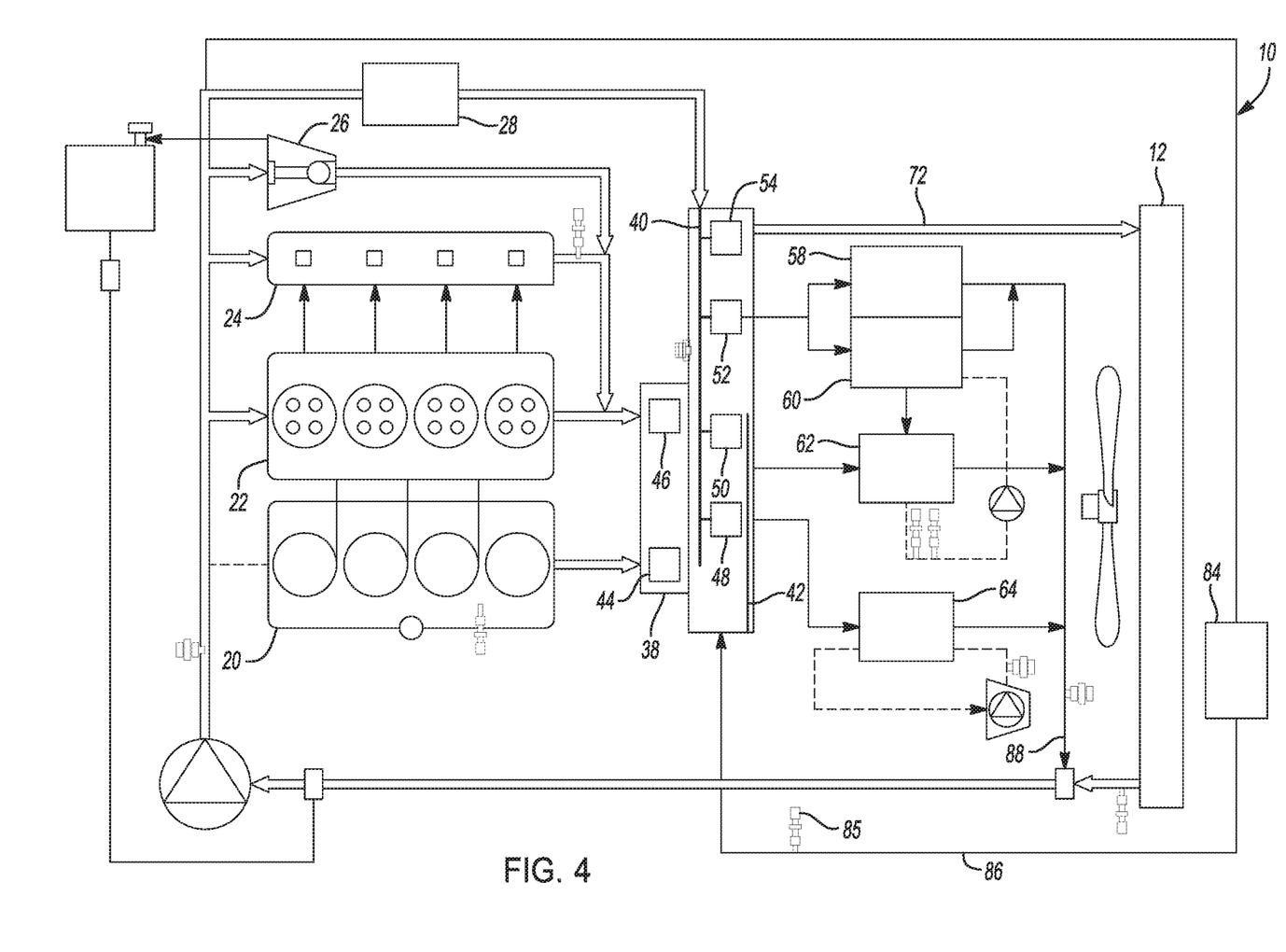
FIG. 4 is a diagram modified from FIG. 1 to highlight a temperature maintaining operation.

The sixth valve port 54 of the radiator rotary valve 40 is operated to direct substantially all of the heated coolant to be returned via the radiator coolant supply line 72 to the radiator 12. The fifth valve port 52 of the radiator rotary valve 40 is closed at this time which prevents coolant flow into any of the first heater core 58 or the second heater core 60. The third valve port 48 and the fourth valve port 50 of the oil rotary valve 42 are also closed at this time which prevents coolant flow from entering the transmission oil heat exchanger 64 and the engine oil heat exchanger 62. There is substantially no coolant flow through the second bypass line 88 during the transmission maintaining operation. There is also substantially no coolant flow through the sub-cooling heat exchanger 84 during the transmission maintaining operation.

Referring to FIG. 5 and again to FIGS. 1 through 4, positions of the engine rotary valve 38, the radiator rotary valve 40 and the oil rotary valve 42 during the transmission maintaining operation are presented. The positions of the engine rotary valve 38 and the radiator rotary valve 40 are substantially unchanged between the transmission warming operation and the transmission maintaining operation. The position of the oil rotary valve 42 is changed between the transmission warming operation and the transmission maintaining operation.

Referring to FIG. 6 and again to FIGS. 1 through 5, a portion of the vehicle thermal management system 10 is highlighted which is used during a transmission cooling operation. The transmission cooling operation is conducted with limited or no coolant flow directed to the first heater core 58, the second heater core 60 or the engine oil heat exchanger 62. To perform the transmission cooling operation the second valve port 46 of the engine rotary valve 38 is opened to direct coolant flow through the engine head 22, the IEM 24, the turbocharger 26, the first valve port 44 for the engine block 20 and the exhaust gas heat exchanger 28 which transfers heat from these engine components to the coolant. Coolant flow through the engine block 20 may also be provided by at least partially and up to fully opening the first valve port 44 of the engine rotary valve 38.

Figure 6:
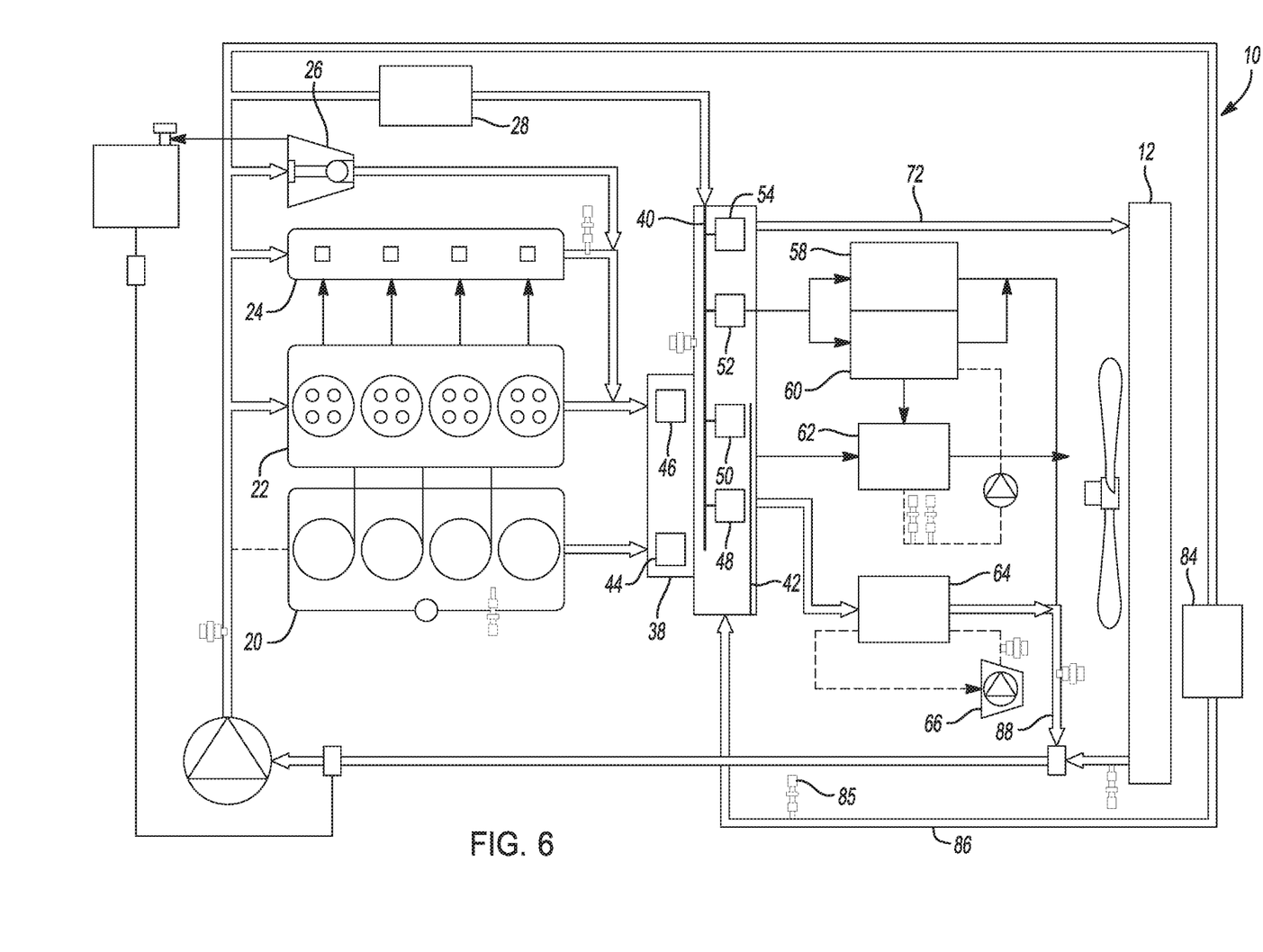
FIG. 6 is a diagram modified from FIG. 1 to highlight a cooling operation.

The sixth valve port 54 of the radiator rotary valve 40 is operated to direct a portion of the heated coolant to be supplied via the coolant supply line 72 to the radiator 12. The fifth valve port 52 of the radiator rotary valve 40 and the fourth valve port 50 of the oil rotary valve 42 are closed at this time which prevents coolant flow into any of the first heater core 58, the second heater core 60 or the engine oil heat exchanger 62. The third valve port 48 of the oil rotary valve 42 is open at this time which allows coolant flow to enter the transmission oil heat exchanger 64. There is also coolant flow through the sub-cooling heat exchanger 84 and therefore through the first bypass line 86 during the transmission cooling operation. In the first bypass line 86 is also located the sub-cooled coolant temperature sensor 85.

Because coolant flowing through the sub-cooling heat exchanger 84 bypasses the engine head 22, the IEM 24, the turbocharger 26, the engine block 20 and the exhaust gas heat exchanger 28 before entering the sub-cooling heat exchanger 84, there is no heat transfer from these engine components to the coolant received by the sub-cooling heat exchanger 84. The coolant exiting the sub-cooling heat exchanger 84 is therefore sub-cooled below the engine operating temperature prior to entering the oil rotary valve 42 and therefore before entering the transmission oil heat exchanger 64. The transmission oil pump 66 is operated to circulate transmission oil through the transmission oil heat exchanger 64. Transmission oil can therefore be sub-cooled below the engine and transmission temperatures by use of the sub-cooling heat exchanger 84.

Referring to FIG. 7 and again to FIGS. 1 through 6, positions of the engine rotary valve 38, the radiator rotary valve 40 and the oil rotary valve 42 during the transmission cooling operation are presented. The position of the engine rotary valve 38 and the radiator rotary valve 40 are substantially unchanged between the transmission warming operation, the transmission maintaining operation and the transmission cooling operation. The position of the oil rotary valve 42 has changed from its position in the transmission maintaining operation to achieve the transmission cooling operation.

Referring to FIG. 8 and again to FIGS. 1 through 7, a control system 92 for the vehicle thermal management system 10 described in reference to FIG. 1 provides a continuous loop signal 94 to a transmission mode selector 96. The transmission mode selector 96 can initiate a transmission warming command 98, a transmission optimal command 100, or a transmission cooling command 102.

Figure 8:
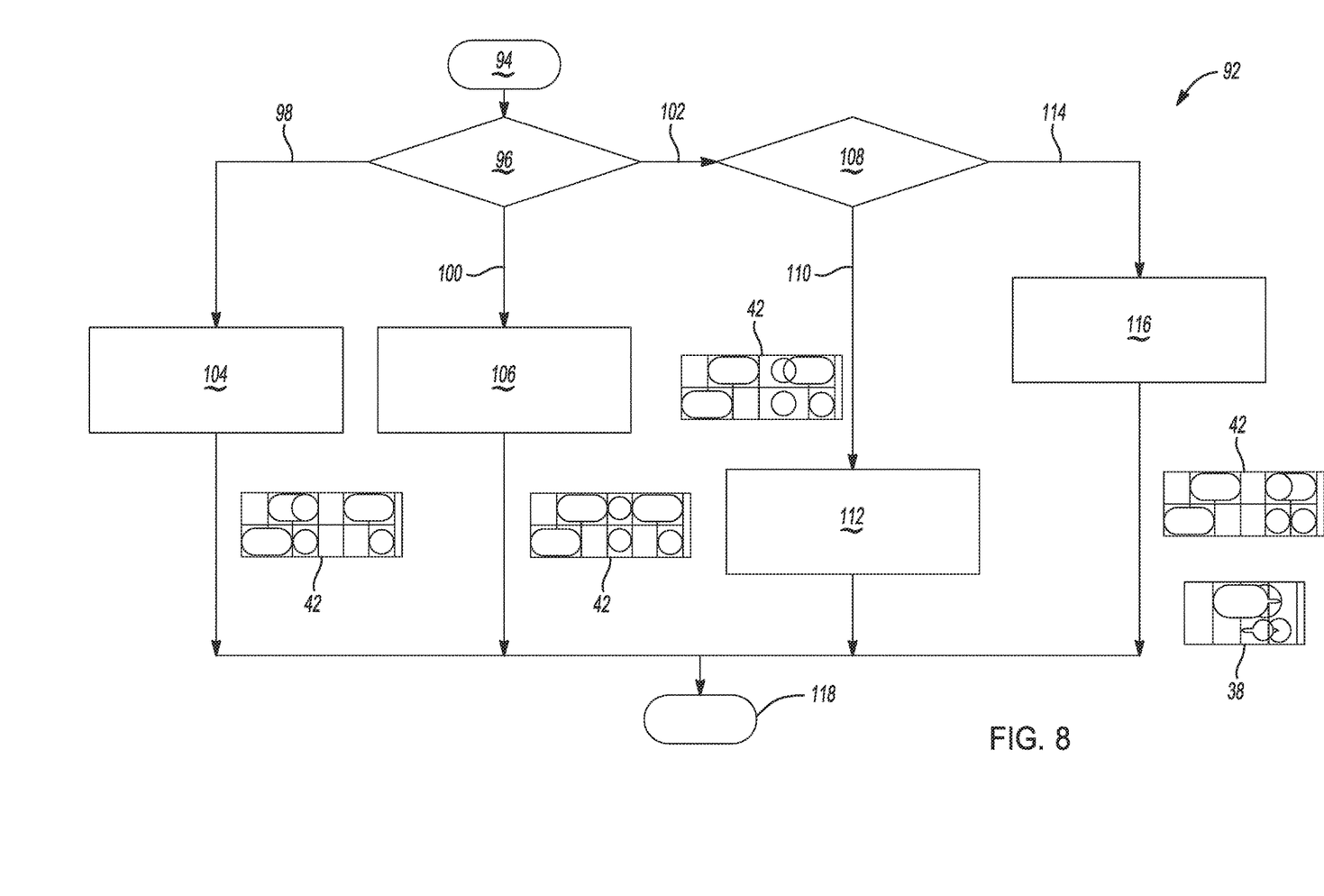
FIG. 8 is a control system diagram for the vehicle thermal management system of FIG. 1.

The control system 92 continuously monitors transmission oil temperatures to determine if the oil temperature is within an optimal temperature range. For example, the optimal temperature range may be approximately six degrees Centigrade, varying above or below a predetermined or target temperature. According to several aspects, the target temperature may be approximately 80 degrees Centigrade. According to several aspects the optimal temperature range may vary between approximately 76 degrees Centigrade up to approximately 82 degrees Centigrade.

If the temperature of the transmission oil is determined to be below the optimal temperature range, the transmission warming operation is initiated which is described in reference to FIG. 2 and the transmission warming command 98 is generated. Upon initiation of the transmission warming command 98, a set-up mode 104 is initiated which performs two functions: a first function sets the engine rotary valve 38 to open full position and sets the radiator rotary valve 40 to a mostly closed position, and a second function sets the oil rotary valve 42 to the transmission warming operation which operates as described in reference to FIGS. 2 and 3.

Figure 5:
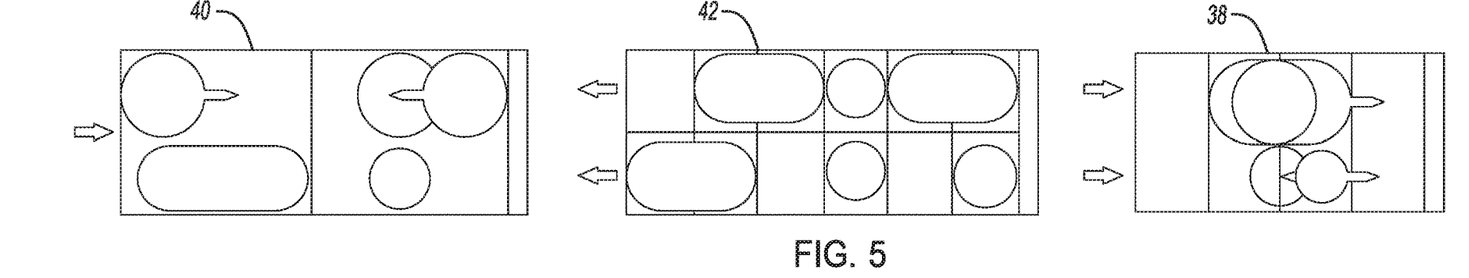
FIG. 5 is a rotary valve position chart including an engine valve, a radiator valve and an oil valve shown in temperature maintaining operation positions.

If the temperature of the transmission oil is determined to be within the optimal temperature range, the transmission temperature maintaining operation is initiated which is described in reference to FIGS. 4 and 5 and the transmission optimal command 100 is generated. Upon initiation of the transmission optimal command 100 an optimal mode 106 is initiated which performs two functions: a first function sets the engine rotary valve 38 to the full open position and sets the radiator rotary valve 40 to a partially open position, and a second function sets the oil rotary valve 42 to a closed position as described in reference to FIGS. 4 and 5.

Figure 7:
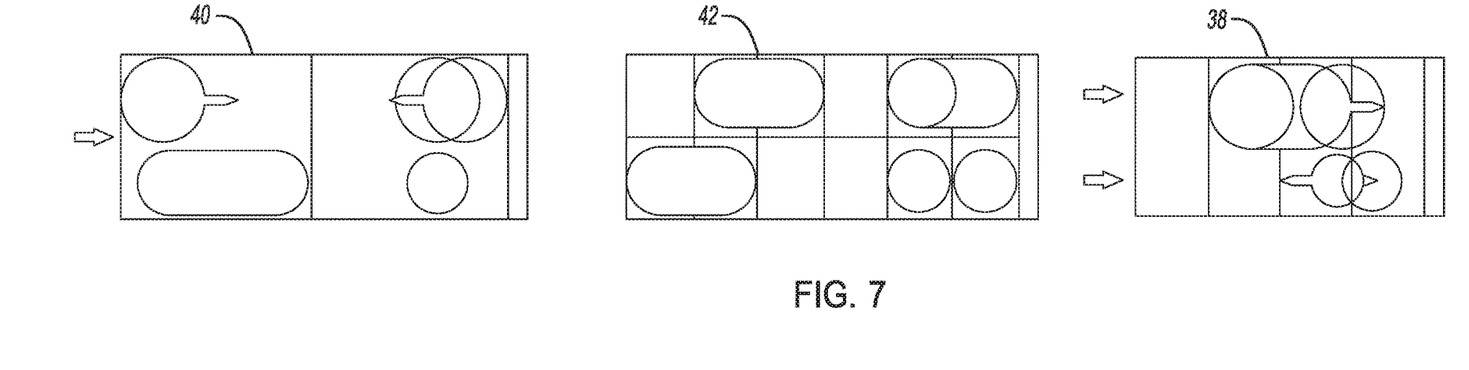
FIG. 7 is a rotary valve position chart including an engine valve, a radiator valve and an oil valve shown in cooling operation positions.

If the temperature of the transmission oil is determined to be above the optimal temperature range, the transmission cooling operation is initiated which is described in reference to FIGS. 6 and 7 and the transmission cooling command 102 is generated. Upon receipt of the transmission cooling command 102 a magnitude of the cooling request 108 is determined. The magnitude of the cooling request 108 identifies if the transmission oil temperature is either below or above a predetermined cooling threshold, which according to several aspects may be approximately 85 degrees Centigrade. If the transmission oil temperature is below the cooling threshold a cooling command 110 is generated and a closed loop cooling mode 112 is initiated which performs two functions: a first function sets the engine rotary valve 38 to the full open position and the radiator rotary valve 40 to a partially open position, and a second function sets the oil rotary valve 42 to the cooling mode as described in reference to FIGS. 6 and 7.

If the transmission oil temperature is above the cooling threshold, a maximum cooling command 114 is generated and a thermal energy-to-transfer calculation 116 is then performed. The thermal energy-to-transfer calculation 116 includes five steps as shown below:

1) Max. Trans Energy=Oil Flow*(Coolant Temp−Trans Oil Temp)
2) Trans HEX Coolant Flow=$c_{p\ Trans\ fluid}/c_{p\ Coolant}$* (Transmission Oil Flow)(density trans fluid/density coolant)
3) Coolant Valve=f(Trans Coolant Flow, Engine Flow, and Sub-Cooled Coolant Temperature)
4) Trans Oil Valve=f (Cooling Mode, Sub-Cooled Coolant Temp, Trans Temp)
5) FAN: IF Q(transmission)<Q(subcool HX) then FAN ON, ELSE FAN OFF In step 1 the maximum transmission energy is calculated using a measure oil flow rate multiplied by a difference between the measured coolant temperature and the transmission oil temperature. In step 2 a determination is made of a coolant flow rate for the sub-cooling heat exchanger 84. This is approximated by dividing a specific heat $c_p$ of the transmission oil by a specific heat $c_p$ of the coolant and multiplying this result by the transmission oil flow rate, and multiplying this by a density of the transmission fluid divided by a density of the coolant. In step 3 a setting of the radiator rotary valve 40 is determined as a function of the transmission coolant flow rate and the engine coolant flow rate and is a function of the sub-cooled coolant temperature. In step 4 the oil rotary valve 42 is set to the transmission cooling operation or the cooling mode as described in reference to FIGS. 6 and 7. In step 5 operation of the radiator fan 17 is selected under the following conditions. If a heat load Q of the transmission is less than a heat load of the sub-cooling heat exchanger 84 then the radiator fan 17 is energized ON, else the radiator fan 17 is OFF. After completion of any of the warming or set-up mode 104, the optimal mode 106, the set-up cooling mode 112, or the performance of the thermal energy-to-transfer calculation 116 the program ends at a step 118. Further conditions for operation of the radiator fan 17 are based on optimized heat transmission, including using physics-based requirements for the sub-cooling heat exchanger 84 as discussed below. These include 1) Transmission Cooling Physics; 2) Operation Degraded Physics; and 3) Reliability Degraded Physics. The fan 17 may also be controlled by other vehicle cooling requirements, such as engine temperature, air conditioning head pressure, engine oil temperature, and the like.

Transmission Cooling Physics:

The following predetermined target temperatures are applied as examples only, and can vary above or below these temperatures as desired. The transmission oil target temperature is set at 80 degrees Centigrade for rear-wheel drive vehicles and 95 degrees Centigrade for front-wheel drive vehicles. Transmission cooling mode is active when the transmission oil target temperature is exceeded and transmission warming operation (if applicable) is complete, or reliability degraded conditions discussed below are present.

Operation Degraded Physics (Applying Fan Logic):

The following transmission oil temperatures are applied as examples only, and can vary above or below these temperatures as desired. Operation Degraded Physics are applied when the transmission oil temperature reaches 85 degrees Centigrade for rear-wheel drive vehicles and 99 degrees Centigrade for front-wheel drive vehicles.

Sub-Cooled Fan Logic: the objective is to provide a sub-cooled heat exchanger temperature correlated to a transmission oil temperature above the transmission oil target temperature. The sub-cooled target temperature is calculated as follows:

Sub-cooled Coolant Target Temp=Transmission Oil Target Temperature−[Transmission oil temperature−Transmission Oil Target Temperature].

The logic for operation of the radiator fan 17 is as follows:
IF: Sub-Cooled heat exchanger TRUE, THEN:
IF: Sub-Cooled Coolant Temperature>Sub-Cooled Coolant Target Temperature THEN FAN Request is ACTIVE, ELSE FAN Request is OFF;
ELSE: If Engine-In Coolant Temperature>[Engine In Target Temperature+Hysteresis] THEN FAN Request is ACTIVE, ELSE FAN Request is OFF.

Reliability Degraded Physics (Applying Both Fan Logic and Pump Logic as Coolant Flow):

The following transmission oil temperatures are applied as examples only, and can vary above or below these temperatures as desired. Reliability Degraded Physics are applied when the transmission oil temperature reaches or exceeds 105 degrees Centigrade. At this time, coolant flow in the transmission cooling circuit is a function of transmission oil flow.

Sub-Cooled Fan Logic:

As noted above for the Operation Degraded Physics, the objective for the Reliability Degraded Physics is to provide a sub-cooled heat exchanger temperature correlated to a transmission oil temperature above the transmission oil target temperature. The logic for operation of the radiator fan 17 is as follows:

IF: Sub-Cooled heat exchanger TRUE, THEN: IF: Sub-Cooled Coolant Temperature>Sub-Cooled Coolant Target Temperature THEN FAN Request is ACTIVE, ELSE FAN Request is OFF;

ELSE: If Engine-In Coolant Temperature>[Engine In Target Temperature+Hysteresis] THEN FAN Request is ACTIVE, ELSE FAN Request is OFF.

Pump Logic (when the coolant pump is applied): the objective is to provide coolant flow optimized for heat rejection of the transmission heat exchanger and corresponding transmission oil flow.

Transmission coolant flow=transmission oil flow× (specific heat $c_p$ of the transmission oil divided by the specific heat $c_p$ of the coolant)×sub-cooled heat exchanger efficiency calibration.

In addition to the transmission oil heat exchanger 64, the present control strategy integrates an additional air-cooled coolant heat exchanger, the sub-cooling heat exchanger 84, for transmission cooling functions. The algorithm first warms then shuts off coolant flow to the transmission oil heat exchanger 64 for best CO2 performance. When additional transmission oil cooling is requested the present strategy controls transmission heat rejection by using one air-to-coolant heat exchanger, one coolant-to-oil heat exchanger, coolant valves, coolant pump and the coolant fan. This is accomplished by coordinating coolant and transmission oil flows to maximize heat rejection. This strategy maximizes coolant dwell time which in turn maximizes transmission heat rejection.

A vehicle thermal management system 10 of the present disclosure offers several advantages. These include further enhancements realized by managing engine coolant flows to maximize transmission cooling while minimizing the negative flow impacts to the engine thermal CO2 performance. An engine coolant control valve is integrated to restrict engine flow that permits optimal combustion wall temperatures while maximizing transmission heat rejection. The vehicle thermal management system 10 manages the integration and control of the coolant supplied transmission sub-cooling heat exchanger. This heat exchanger provides coolant at lower temperatures than the engine setpoints for oil cooling and allows optimal drive quality without compromising CO2 through physics-based controls. The hardware components include the coolant-based sub-cooling heat exchanger or coolant cooler, a coolant control valve, the coolant pump and the cooling fan. The present transmission cooling strategy is designed to enhance shift quality and improve overall transmission durability and fuel efficiency.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A vehicle thermal management system, comprising:
a radiator receiving a coolant in a coolant supply line and discharging the coolant into a coolant pump supply line;
a coolant pump receiving the coolant from the coolant pump supply line and discharging the coolant into multiple engine components;
a transmission coolant-to-oil oil heat exchanger defining a first transmission oil heat exchanger receiving the coolant after being discharged from the multiple engine components;
an air-to-coolant sub-cooling heat exchanger defining a second transmission oil heat exchanger, the sub-cooling heat exchanger receiving a portion of the coolant bypassing the multiple engine components; and
a coolant control valve to control sub-cooling coolant flow to the sub-cooling heat exchanger, wherein the coolant control valve includes:
an engine rotary valve;
an oil rotary valve distributing at least one of the coolant received in the coolant control valve and from the sub-cooling heat exchanger; and
a radiator rotary valve distributing the coolant received in the coolant control valve back to the radiator or to an oil rotary valve.

2. The vehicle thermal management system of claim 1, further including a first bypass line connected to the coolant control valve providing a path to bypass the coolant discharged from the coolant pump after receipt from the radiator around the engine components and into the sub-cooling heat exchanger.

3. The vehicle thermal management system of claim 1, wherein if a temperature of a transmission oil is determined to be above an optimal temperature range, a transmission cooling operation is initiated and a transmission cooling command is generated.

4. The vehicle thermal management system of claim 3, wherein upon receipt of the transmission cooling command a maximum cooling request is determined, the maximum cooling request identifying if the temperature of the transmission oil is either below or above a predetermined cooling threshold.

5. The vehicle thermal management system of claim 4, wherein if the temperature of the transmission oil is below the cooling threshold a cooling command is generated and a set-up cooling mode is initiated which performs two functions: a first function sets the engine rotary valve to a full open position and the radiator rotary valve to flow the coolant to the radiator, and a second function sets the oil rotary valve to a cooling mode.

6. The vehicle thermal management system of claim 4, wherein if the transmission oil temperature is above the cooling threshold, a maximum cooling command is generated and a thermal energy-to-transfer calculation is performed.

7. The vehicle thermal management system of claim 6, wherein the thermal energy-to-transfer calculation includes:
determining a coolant flow rate for the sub-cooling heat exchanger;
determining a setting of the oil rotary valve as a function of a transmission oil flow rate and an engine coolant flow rate;
setting the oil rotary valve to a transmission cooling operation; and
selecting operation of a radiator fan ON if a transmission heat load is less than a heat load of the sub-cooling heat exchanger, else the radiator fan is OFF.

8. The vehicle thermal management system of claim 1, wherein the sub-cooling heat exchanger further cools the coolant discharged from the radiator to provide the coolant at lower temperatures than engine setpoints for cooling a transmission oil.

9. A vehicle thermal management system, comprising:
a radiator receiving a liquid coolant from a coolant supply line and discharging the coolant into a coolant pump supply line;

a coolant pump receiving the coolant from the coolant pump supply line and discharging a first portion of the coolant into multiple engine components;

a coolant control valve receiving the first portion of the coolant discharged from the multiple engine components;

a transmission oil heat exchanger defining a first transmission oil heat exchanger in communication with the coolant control valve and receiving the first portion of the coolant after being discharged from the multiple engine components; and an air-to-coolant sub-cooling heat exchanger defining a second transmission oil heat exchanger, the sub-cooling heat exchanger receiving a second portion of the coolant bypassing the multiple engine components, the sub-cooling heat exchanger further cooling the second portion of the coolant to provide the second portion of the coolant at a lower temperature than engine setpoints for cooling a transmission oil, the sub-cooling heat exchanger discharging the second portion of the coolant into the coolant control valve for selective distribution into the transmission oil heat exchanger; and wherein the coolant control valve controls a sub-cooling coolant flow to the sub-cooling heat exchanger and includes:

an engine rotary valve receiving coolant discharged from the multiple engine components;

a radiator rotary valve distributing at least one of the coolant received from the engine rotary valve and the multiple engine components back to the radiator; and an oil rotary valve distributing the coolant received from the radiator rotary valve and from the sub-cooling heat exchanger.

10. The vehicle thermal management system of claim 9, wherein the radiator rotary valve is further connected to at least one heater core, and the oil rotary valve is connected to an engine oil heat exchanger.

11. The vehicle thermal management system of claim 9, further including a radiator fan operated to positively draw air through the radiator, wherein conditions for operation of the radiator fan are based on optimized heat transmission, for the sub-cooling heat exchanger including: 1) a Transmission Cooling Physics defining a transmission oil target temperature and a transmission cooling mode; 2) an Operation Degraded Physics defining a transmission oil target temperature and a sub-cooled fan logic objective; and 3) a Reliability Degraded Physics defining a transmission oil temperature, a sub-cooled target coolant temperature, a pump logic and a transmission coolant flow.

12. The vehicle thermal management system of claim 11, wherein the Transmission Cooling Physics include:

the transmission oil target temperature is set at a first predetermined temperature for rear-wheel drive vehicles and a second predetermined temperature different from the first predetermined temperature for front-wheel drive vehicles; and the transmission cooling mode being active when the transmission oil target temperature is exceeded and a transmission warming operation is complete.

13. The vehicle thermal management system of claim 11, wherein the Operation Degraded Physics include:

the transmission oil target temperature reaching a first predetermined temperature for rear-wheel drive vehicles and a second predetermined temperature different from the first predetermined temperature for front-wheel drive vehicles;

the sub-cooled fan logic objective providing a sub-cooled coolant target temperature correlated to a transmission oil temperature above the transmission oil target temperature, the sub-cooled target temperature calculated as follows:

sub-cooled coolant target temp =transmission oil target temperature −[transmission oil temperature −transmission oil target temperature]; and IF: a sub-cooled coolant temperature >sub-cooled coolant target temperature THEN FAN Request is ACTIVE, ELSE FAN Request is OFF;

ELSE: If engine-in coolant temperature >[engine in target coolant temperature +Hysteresis]THEN FAN Request is ACTIVE, ELSE FAN Request is OFF.

14. The vehicle thermal management system of claim 11, wherein the Reliability Degraded Physics include:

the transmission oil temperature reaching or exceeding a third predetermined temperature;

the sub-cooled target coolant temp =transmission oil target temperature −[transmission oil temperature −transmission oil target temperature]; and IF: sub-cooled coolant temperature >sub-cooled coolant target temperature THEN FAN Request is ACTIVE, ELSE FAN Request is OFF;

ELSE: If engine-in coolant temperature >[engine in coolant target temperature +Hysteresis]THEN FAN Request is ACTIVE, ELSE FAN Request is OFF;

the pump logic wherein a coolant temperature exiting the sub-cooled heat exchanger is at the transmission oil target temperature; and the transmission coolant flow =transmission oil flow ×(specific heat of the transmission oil divided by a specific heat of the coolant) +sub-cooled heat exchanger efficiency calibration.

15. A vehicle thermal management system, comprising:

a radiator receiving a coolant from a coolant supply line and discharging the coolant into a coolant pump supply line;

a coolant pump receiving the coolant from the coolant pump supply line and discharging a first portion of the coolant into multiple engine components;

a coolant control valve receiving the first portion of the coolant discharged from the multiple engine components;

a transmission oil heat exchanger defining a first transmission oil heat exchanger in communication with the coolant control valve and receiving the first portion of the coolant after being discharged from the multiple engine components;

an air-to-coolant sub-cooling heat exchanger defining a second transmission oil heat exchanger, the sub-cooling heat exchanger receiving a second portion of the coolant bypassing the multiple engine components, the sub-cooling heat exchanger further cooling the second portion of the coolant to provide the second portion of the coolant at a lower temperature than engine setpoints to cool a transmission oil; and a radiator fan, wherein conditions for operation of the radiator fan are based on optimized heat transmission including application of physics-based requirements for the sub-cooling heat exchanger;

wherein the coolant control valve includes:

an engine rotary valve receiving coolant discharged from the multiple engine components;

a radiator rotary valve distributing at least one of the coolant received from the engine rotary valve and the multiple engine components back to the radiator; and an oil rotary valve distributing the coolant received from the radiator rotary valve and from the sub-cooling heat exchanger.

16. The vehicle thermal management system of claim 15, further including a valve of the coolant control valve operated to:

divert the second portion of the coolant through the sub-cooling heat exchanger during a cooling mode of operation when a transmission oil target temperature exceeds a predetermined temperature, the coolant control valve operating to stop all flow of the coolant to the transmission oil heat exchanger during an optimal temperature operation;

divert hot coolant for warming the transmission oil; and regulate coolant flow to maintain and optimize transmission oil temperature; and wherein the sub-cooling heat exchanger discharges the second portion of the coolant into the coolant control valve for selective distribution into the transmission oil heat exchanger.

* * * * *